(12) United States Patent
Gupta et al.

(10) Patent No.: US 7,554,913 B2
(45) Date of Patent: *Jun. 30, 2009

(54) RESOURCE ALLOCATION IN A CIRCUIT SWITCHED NETWORK

(76) Inventors: Vivek Gupta, 1128 Oregon Ave., Palo Alto, CA (US) 94306; Sumit Sanyal, 345 Sheridan Ave., Palo Alto, CA (US) 94306; Xiangzhong Zeng, 1682 Marco Dr., San Jose, CA (US) 95131; Stephen J. Sifferman, 366 N. Cypress Ave., Santa Clara, CA (US) 95050; Leah J. Fera, 681 Willow Glen Way, San Jose, CA (US) 95125; Christopher R. Uhlik, 345 Love La., Danville, CA (US) 94526

( * ) Notice: Subject to any disclaimer, the term of this patent is extended or adjusted under 35 U.S.C. 154(b) by 595 days.

This patent is subject to a terminal disclaimer.

(21) Appl. No.: 11/089,958

(22) Filed: Mar. 25, 2005

(65) Prior Publication Data

US 2005/0169178 A1    Aug. 4, 2005

Related U.S. Application Data

(63) Continuation of application No. 09/751,857, filed on Dec. 30, 2000, now abandoned.

(51) Int. Cl.
*G01R 31/08* (2006.01)

(52) U.S. Cl. .............. 370/234; 370/252; 370/329
(58) Field of Classification Search ............... 370/230, 370/234, 328, 351, 229, 349, 232; 375/346, 375/350; 455/452
See application file for complete search history.

(56) References Cited

U.S. PATENT DOCUMENTS

| | | | | |
|---|---|---|---|---|
| 5,697,059 | A * | 12/1997 | Carney ................... | 455/509 |
| 5,822,700 | A * | 10/1998 | Hult et al. ............... | 455/466 |
| 6,693,877 | B1 * | 2/2004 | Hengl et al. ............. | 370/229 |
| 6,888,795 | B2 * | 5/2005 | Gupta et al. ............. | 370/230 |

* cited by examiner

*Primary Examiner*—Seema S Rao
*Assistant Examiner*—Henry Baron
(74) *Attorney, Agent, or Firm*—Stolowitz Ford Cowger LLP

(57) ABSTRACT

Allocating resources in a circuit switched data network, comprising receiving a request for a resource from a device coupled to the circuit switched data network and granting the resource to the requesting device if the resource is available. If the resource is not available, then examining the instantaneous quantity of data to be transmitted by the requesting device; the rate of change in the instantaneous quantity of data to be transmitted by the requesting device; and the time of utilization of the resource by the requesting device, and granting the resource to the requesting device based on the examination of the three factors.

32 Claims, 2 Drawing Sheets

RESOURCE ALLOCATION IN A CIRCUIT SWITCHED NETWORK

RELATED APPLICATION

This application is a continuation application of U.S. patent application Ser. No. 09/751,857, entitled "Improved Resource Allocation in a Circuit Switched Network," filed on Dec. 30, 2000 now abandoned.

FIELD OF THE INVENTION

The present invention is relates to a method for allocating resources in a circuit switched network, such as radio frequency (RF) channels in the circuit switched network.

BACKGROUND OF THE INVENTION

With reference to FIG. 2, a communications network infrastructure is illustrated, wherein multiple subscriber units (SU) SU1 through SUn communicate over circuit switched connections, for example, to a mobile switching center (MSC) 230 via a "wireless local loop" radio frequency interface provided by a base station (BS) 235. Ultimately, the subscriber units, or remote devices attached thereto, may communicate end to end with a host device, such as an application service provider (ASP) 205. Information, for example, in the form of packets of data, are transmitted between an SU and the MSC over radio frequency (RF) channels allocated to the SU by the BS 235 for the duration of the packet transmissions. Data packets received at the MSC by way of BS 235 are forwarded to the data packets over a public switched telephone network (PSTN) 225 to the ASP 205.

The packet switch network comprises, for example, a gateway 220, such as Transport Control Protocol/Internet Protocol (TCP/IP) gateway, that couples the PSTN 225 to an internet 215, such as the Internet or an intranet. The ASP 205, in turn, is coupled to the internet 215 via a network switching device 210. A connection between devices in a packet switched network environment is set up, that is, allocated, just prior to transmitting a stream of data packets, and then torn down immediately after the packets are transmitted. Later, if additional information is to be exchanged between the ASP 205 and a subscriber unit, another connection is set up and later torn down at the appropriate times to handle the transmission of subsequent data packets between the ASP 205 and the subscriber unit.

However, a connection in a circuit switched network, for example, between BS 235 and a subscriber unit, typically requires setting up a dedicated communications channel between the SU and the BS. The channel remains allocated even when no packets are being transmitted between the BS and the SU, and is torn down only when requested to do so by either the BS or the SU. There may be significant periods of time during which the allocated channel is idle.

The set up and tear down of a communications channel in a circuit switched network typically consumes more time and overhead than in a packet switched network, and the channel may be underutilized, for example, by remaining idle for extended periods of time. Additionally, there may be many more subscriber units, each capable of establishing multiple simultaneous communications channels with the BS, than there are communications channels capable of being simultaneously allocated.

Additionally, there is the well known concept of quality of service, or grade of service, in a packet switched network environment, in which factors such as minimum latency and bandwidth are considered. When communicating packet switched data from a subscriber unit over a circuit switched network, and then to a destination device, such as ASP 205, coupled to the packet switched network, a resource allocation scheme is needed in the circuit switched network to meet or exceed the minimum quality of service for data transmissions in the packet switched network.

It is understood that well known wireless communication protocols, such as CDPD, GPRS and EDGE, employ resource allocation schemes to efficiently allocate RF channels. However, such protocols are thought to rely solely on the amount of data queued for transmission by a particular subscriber unit relative to other subscriber units. What is needed is an allocation scheme that considers other equally or more pertinent factors.

SUMMARY

The present invention contemplates allocating resources in a circuit switched data network. The process comprises receiving a request for a resource from a device coupled to the circuit switched data network and granting the resource to the requesting device if the resource is available. However, if the resource is not available, the process involves examining the instantaneous quantity of data to be transmitted by the requesting device; the rate of change in the instantaneous quantity of data to be transmitted by the requesting device; and the time of utilization of the resource by the requesting device. The resource is granted to the requesting device based on a consideration of at least these three factors.

BRIEF DESCRIPTION OF THE DRAWINGS

The present invention is illustrated by way of example, and not necessarily by way of limitation in the figures of the accompanying drawings in which like reference numerals refer to similar elements.

DETAILED DESCRIPTION OF THE INVENTION

Figure 1:
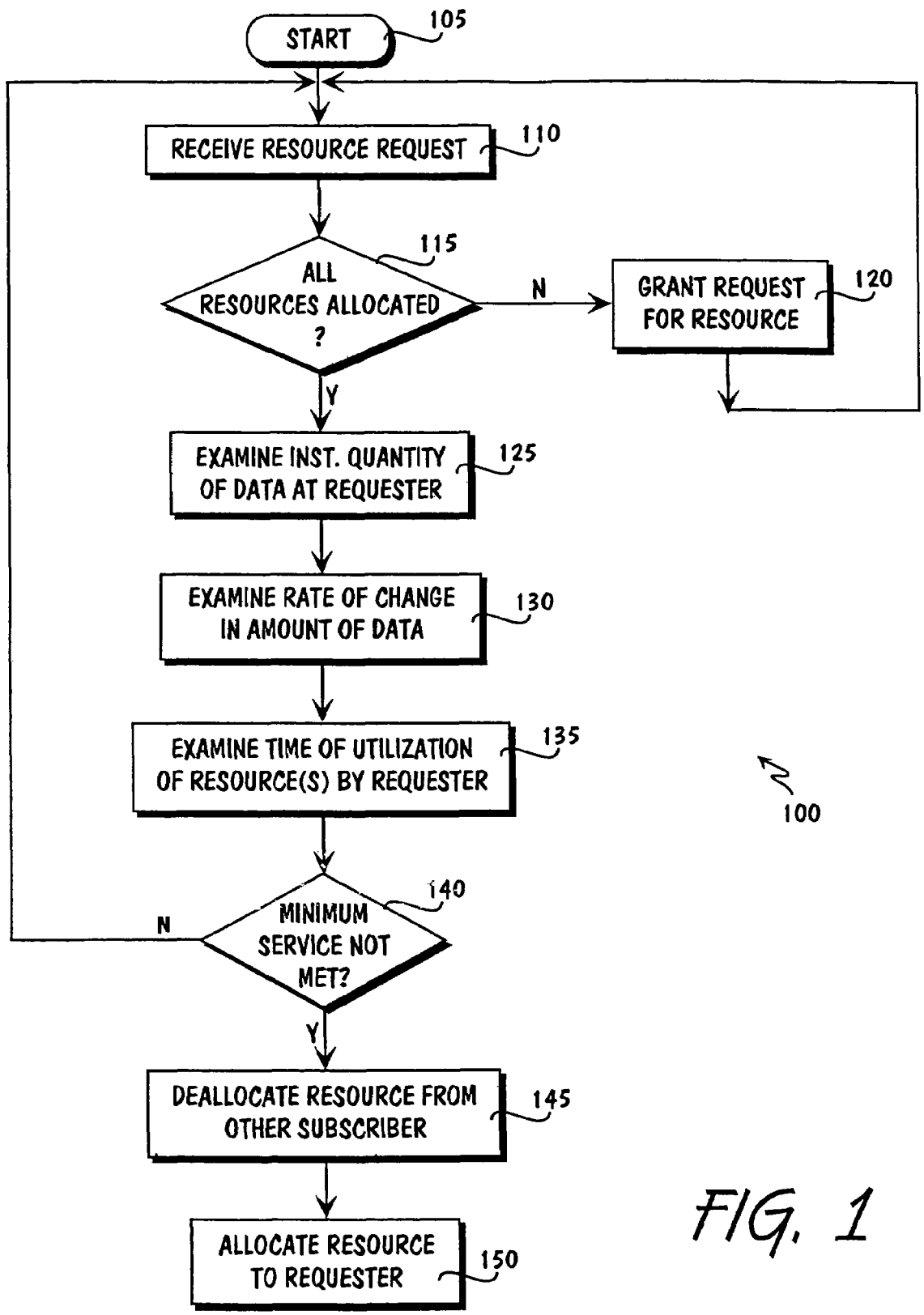
FIG. 1 is a flow diagram of a process in one embodiment of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description that follow are presented in terms of algorithms and symbolic representations of operations on data within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise apparent from the following discussion throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to apparatus for performing the operations herein. These apparatus may be specially constructed for the required purposes, or may comprise a general-purpose computer selectively activated or reconfigured by a computer program stored in the computer. Such a computer program may be stored in a machine-readable storage medium, such as, but not limited to, any type of magnetic or other disk storage media including floppy disks, optical storage media, CD-ROMs, and magnetic-optical disks, read-only memories (ROMs), random access memories (RAMs), EPROMs; EEPROMs, magnetic or optical cards, flash memory devices; electrical, optical, acoustical or other form of propagated signals (e.g., carrier waves, infrared signals, digital signals, etc.); etc. or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 2:
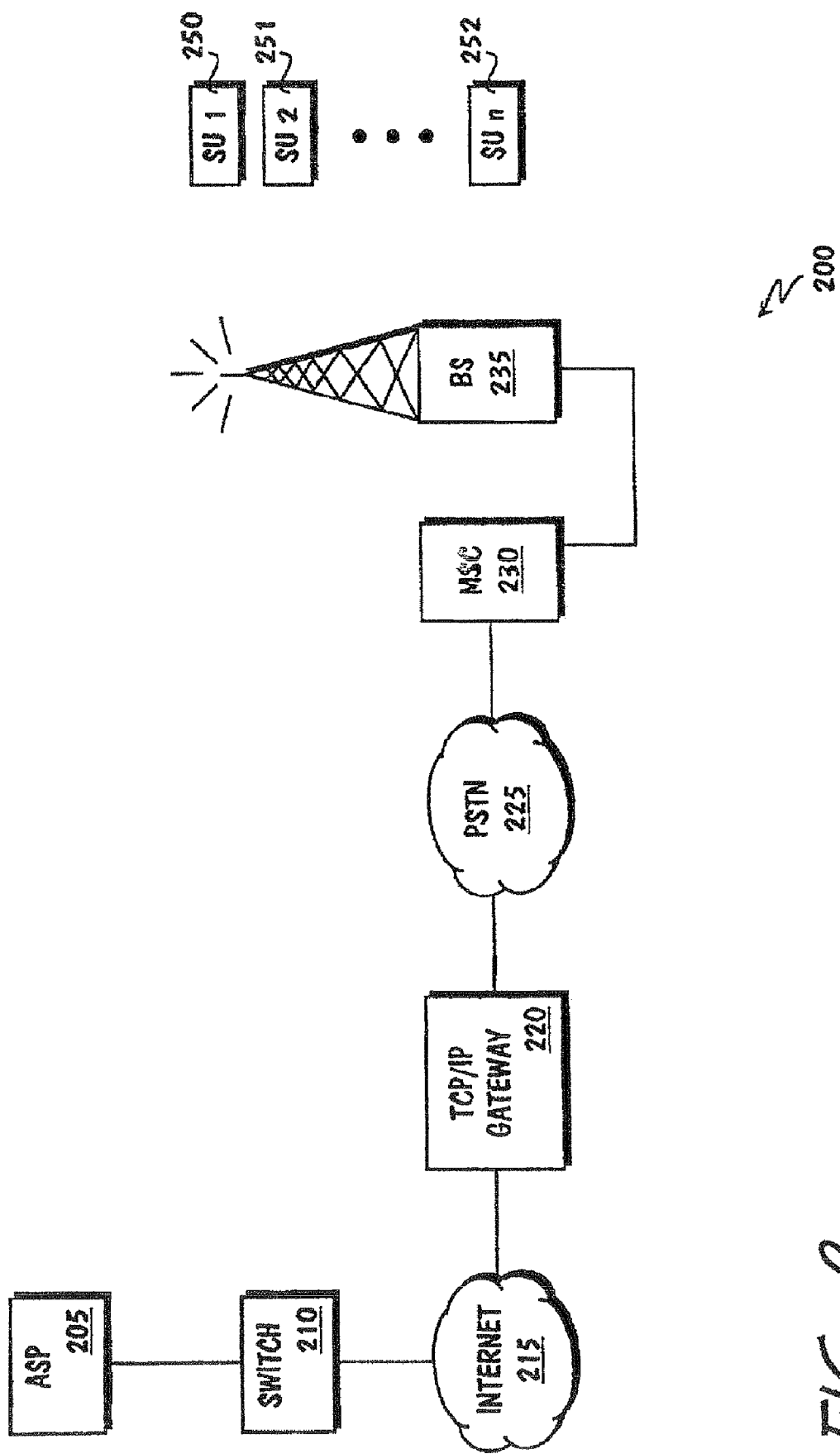
FIG. 2 is a diagram of a packet switched communications over a circuit switched data network, and in which an embodiment of the present invention operates.

In one embodiment of the invention, resources are allocated on demand. In particular, resources are allocated for the transmission of packet switched data over a circuit switched network such as illustrated in FIG. 2. While the circuit switched network illustrated in FIG. 2 represents a "wireless local loop" network between a number of subscriber units and a base station/mobile switching center, it will be apparent that the present invention is likewise applicable to other circuit switched data networks, for example, an Asynchronous Transfer Mode (ATM), Frame Relay, X.25 or other circuit switched data networks. Thus, the present invention may be utilized to allocate resources among devices in any circuit switched data network environment and is not limited to the wireless local loop environment comprising a base station and a number of subscriber units, as herein described as an example embodiment of the present invention.

In one embodiment of the present invention, the resource being allocated among subscriber units is a number of radio frequency (RF) channels. A base station controls the allocation of such RF channels to a number of subscriber units. In one embodiment, the subscriber units outnumber the RF channels. Moreover, the subscriber units may request and be simultaneously allocated multiple RF channels. It is appreciated, however, that the inventive techniques described herein may equally be applicable to the allocation of other resources common to the transmission of data in a circuit switched network, for example, memory or buffer space, or other resources utilized and shared among a number of devices. However, for purposes of understanding the invention, the description herein will be focused on allocating communication channels in a circuit switched data network, and in particular, allocating RF communication channels in a wireless circuit switched data network environment.

With reference to FIG. 2, the present invention is contemplated as being utilized in a circuit switched network carrying packet switched data. A central base station (BS) 235 has a maximum capacity of some number of RF channels operating simultaneously. An algorithm implemented in the BS allocates the RF channels to individual subscriber units, considering three factors:

1) the data rate of each subscriber unit;
2) the rate of change of the data rate of each subscriber unit; and
3) the amount of time for which each subscriber unit has been allocated an RF channel resource.

With respect to the first above mentioned factor, RF channels are allocated to a subscriber unit in proportion to the SU's data rate relative to the data rate of other SUs competing for the same RF channel resources. Data rate, as that phrase is used herein, refers to the rate at which data in the form of data packets is received and queued at the SU for transmission over the circuit switched network. Additionally, as per the second above mentioned factor, the BS takes further into consideration the trend or change in the data rate for each SU. In another embodiment, the algorithm operating at the BS additionally considers the amount of time for which a subscriber unit already has been allocated a number of RF channels. In yet another embodiment, the BS considers a moving average of one or more of the above described three factors in addition to or in place of consideration of the three factors. This is particularly advantageous if there is a relative spike or peak in one or more of the values for the three factors. Thus, if the extent to which the most recent measurement of one of the factors diverges significantly from previous measurements for the factor, the most recent measurements may be discarded or at least given less of a weighting factor.

In one embodiment, the BS is capable of associating a weighting factor with one or more of the above three factors, to vary the extent to which the BS relies on any one particular factor in deciding whether to allocate an RF channel to a subscriber unit. For example, given bursty data traffic, a higher weight may be assigned to the rate of change of the data rate.

The algorithm operating on the BS, in one embodiment, is implemented in software. The BS executes the software which, by taking into consideration the three above mentioned factors, maximizes the throughput of the base station as well as the data rate of individual subscriber units, and attempts to maximize the quality of service, or grade or service, of data packet transmissions anticipated or negotiated by or on behalf of the subscriber units. Software also executes on each of the subscriber units to provide the information relating to the three factors on which the base station decides to allocate RF channels among the subscriber units.

With reference to FIG. 1, the process of RF channel allocation, in accordance with an embodiment of the present invention, is as follows. The process starts at 105 with both BS and a number of subscriber units powered up and ready for operation. An individual SU, say SU1, monitors the size of a data transmission queue on the SU, and the rate of change in the data rate (which can be derived from the rate of change in the size of the data transmission queue on the SU). Based on these factors, the SU determines whether it needs additional or less RF channels to transmit data in the queue waiting to be transmitted to the BS. In one embodiment, the SU further monitors the number of RF channels already allocated to the SU, if any, and considers this allocation as well in determining whether it needs additional RF channels to transmit data waiting in the data transmission queue to the BS.

There is also a notion of a moving average data transmission queue length. When the SU's data transmission buffer reaches a threshold, say 80% full (wherein such percentage may be based on the instantaneous and/or moving average buffer size), the SU transmits an RF channel allocation request at 110, requesting a number of RF channels to be allocated to the SU.

It should be noted that while the above discussion refers to a threshold for the size of the data transmission buffer for a subscriber unit, a threshold may be associated with any one or more of the factors being given consideration under the algorithm contemplated by the present invention. When any one threshold is reached or exceeded for some minimum amount or period of time, a request to allocate an additional RF channel resource is generated by the SU and transmitted to the BS. In essence, then, the thresholds determine how many RF channels are allocated per subscriber unit. Moreover, different thresholds can be set depending on the level or quality of service desired for any one particular subscriber unit.

In one embodiment of the present invention, the requesting subscriber unit may alter or adjust the threshold at which a request for additional allocation of RF channel resources is issued based on the number of channels already allocated to the subscriber unit. Essentially, then, the number of channels already allocated to the subscriber unit provides the subscriber unit with the ability to generate requests of varying levels of priority. The more channels already allocated to the subscriber unit, the higher the threshold before triggering a request for allocation of yet another RF channel. In one embodiment, a subscriber unit may request and receive up to four simultaneous RF channels. It is appreciated, however, that the number of channels allocated may differ more or less than four without departing from the present invention.

At the BS, the RF channel allocation algorithm receives the RF channel allocation request from SU1, and at 115 examines whether there are available RF channels that can be allocated to SU1. The BS monitors the RF channel usage of all subscriber units within the domain of the BS and the maximum RF channel capacity of the system. The BS therefore is able to determine whether any RF channels are immediately available for allocation to SU1. The BS further monitors the number of RF channels allocated per subscriber unit, including the SU from which it received the RF channel allocation request. The BS also monitors outstanding requests for RF channels from other subscriber units, and the length of time an RF channel is utilized by a particular subscriber unit.

In one embodiment, the BS grants the request for RF channel allocation if the BS detects available channels, at step 120. The BS, for example, maintains a queue of available channels, and allocates one of the available RF channels in the queue to the requesting subscriber unit.

If there are more requests for RF channel allocation than there are RF channels, the BS decides whether to honor the RF channel allocation request from a particular subscriber unit, or deny the request. The BS station, in making such a decision, considers three factors, not necessarily in the order as discussed as follows. The BS examines, at 125, the instantaneous quantity or amount of data queued at the SU for transmission to the BS. This information typically is provided to the BS in the allocation request transmitted from the SU to the BS. The BS further examines the rate of change in the amount of data queued at the SU for transmission, at 130. The rate of change can be calculated and monitored on the BS based on previous requests for resources transmitted by the same SU, or such information may calculated, monitored, and provided by the SU in the resource allocation request. It is appreciated that as the data transmission queue on the SU increases in length, or the rate of change in the amount of data queued for transmission from the SU increases, the resource allocation request from the SU may carry greater weight with the BS. At 135, the BS additionally examines the amount of time that the SU has been allocated one or more RF channels. In one embodiment, the BS associates a weight to one or more of the factors and considers at 140 whether to honor the request in order to provide a certain quality or grade of service, based on the three factors and any weights associated therewith.

If the desired quality of service is not being met for the requesting subscriber unit, the BS allocates an RF channel resource to the requesting subscriber unit. In one embodiment, as RF channels no longer are utilized by other of the subscriber units, a queue is maintained on the BS, the queue tracking RF channels that are no longer in use and can be torn down for later setup and use by other subscriber units. In allocating an RF channel to the requesting subscriber unit, the BS first checks whether the teardown queue has one or more RF channels that can be torn down and then set up for the requesting subscriber unit. If there are no RF channels to be torn down, the BS, at 145, having knowledge of all RF channels in use, and the number of RF channels allocated to each subscriber unit in the domain of the BS, selects an RF channel to deallocate from a subscriber unit. At 150, the now available RF channel is allocated to the requesting subscriber unit. In one embodiment, the BS will tear down an RF channel allocated to a subscriber unit with the most number of RF channels allocated for the longest time. Alternatively, the BS maintains track of the utilization of each RF channel resource and tears down/deallocates a least used RF channel. It is appreciated that the number and duration of channel allocations per subscriber unit may be maintained in a separate queue.

If, at 140, the grade of service desired for a subscriber unit is being met or exceeded, given that no RF channel resources are available, the BS does not honor the request for RF channel allocation and waits to receive another RF channel resource request at 110.

All requests received by the BS from the subscriber units are maintained in a queue to both track and maintain the order of requests as they arrive at the BS. If there are entries in the tear down queue, that is, the queue that maintains the RF channels no longer utilized by a subscriber unit, the first, or oldest, channel allocation request may be honored by granting thereto the first, or oldest, RF channel tracked in the tear down queue. If there are no entries in the tear down queue, the BS will add a subscriber unit's request for RF channel allocation to a set up queue in the order it was received.

In one embodiment, the RF channel allocation requests from a particular subscriber unit may be prioritized in relation to the RF channel allocation requests from other subscriber units, based on the number of channels already allocated to the particular subscriber unit, and/or the number of RF channels being-requested by the particular subscriber unit.

Thus far, the discussion of the present invention has focused on the SU requesting an RF channel to transmit information to the BS in the uplink direction, that is, from the SU to the BS. It is appreciated, however, that the invention operates essentially in the same manner when the BS is requesting an RF channel to transmit information to the SU in the downlink direction, that is, from the BS to the SU. The significant distinctions in allocating RF channels for downlink versus uplink transmissions, of course, is that the BS becomes the device that initiates the resource allocation request, and is the device that monitors all the factors considered by the algorithm. Thus, for example, the BS monitors the depth of the data transmission queue at the BS for a particular SU and the rate of change in the depth of the data transmission queue, rather than the SU monitoring such factors. The BS further monitors the number of RF channels already allocated between the BS and the SU to which it has data to transmit, and the amount of time the already allocated RF channels have been utilized for transmitting data from the BS to the SU. After considering all these factors, the BS makes a decision to initiate a resource allocation request, in particular, a RF channel allocation request. The request is internal, that is, the "bandwidth on demand" software executing on the BS causes the BS to initiate an internal request to itself to allocate a channel for communicating data in a data transmission queue in the BS with the SU.

The present invention thus attempts to grant a new subscriber unit an RF channel, while minimizing latency and maximizing throughput in the circuit switched network.

What is claimed is:

1. A method for resource allocation in a circuit switched network, the method comprising:
   analyzing a rate at which data is received and queued at a device for transmission over the circuit switched network;
   analyzing a change in the rate at which the data is received and queued at the device for transmission over the circuit switched network
   analyzing a resource utilization time corresponding to the device; and
   granting a resource to the device according to the analyses.

2. The method of claim 1, further comprising:
   receiving a transmission request from the device;
   determining whether there are any unallocated channel resources available in response to receiving the transmission request; and
   conducting the analyses based on a result of the determination;
   wherein the analyses are conducted only if there are no unallocated channel resources available, and if the resource is granted according to the analyses, the resource is granted by reallocating a channel resource from another device.

3. The method of claim 1 further comprising granting the resource to the device based only on the analyses.

4. The method of claim 1, further comprising conducting the analyses in response to a depth of a data transmission queue for the device being reached.

5. The method of claim 4, further comprising conducting the analyses in response to a moving average of the depth of the data transmission queue for the device being reached.

6. The method of claim 1, further comprising conducting the analyses in response to a rate of change in a depth of a data transmission queue for the device being reached.

7. The method of claim 6, further comprising conducting the analyses in response to a moving average of the rate of change in the depth of the data transmission queue for the device being reached.

8. The method of claim 1, further comprising conducting the analyses in response to a utilization time of the resource by the device being reached.

9. The method of claim 8, further comprising conducting the analyses in response to a moving average of the utilization time of the resource by the device being reached.

10. The method of claim 3, further comprising adjusting a threshold for requesting the resource based on a number of resources already allocated to the device.

11. The method of claim 1, further comprising de-allocating the resource from another device before granting the resource to the device.

12. An apparatus comprising:
    means for examining a first factor corresponding to a rate at which data is received and queued at a device for transmission over a circuit switched network;
    means for examining a second factor corresponding to a change in the rate at which the data is received and queued at the device for transmission over the circuit switched network;
    means for examining a third factor corresponding to a resource utilization time the device; and
    and means for allocating a resource to the device according to the examinations of the first, second, and third factors.

13. The apparatus of claim 12, wherein the resource includes communications channel means in the circuit switched network.

14. The apparatus of claim 13, wherein the allocation means provides the resources to the device based only on the examinations of the first, second, and third factors.

15. The apparatus of claim 12, further comprising:
    means for receiving a request for the resource from the device;
    where the means for examining the first, second, and third factors operates responsive to the request.

16. The apparatus of claim 15, wherein the means for receiving the request includes means for receiving the request for the resource if a threshold for requesting the resource has been achieved.

17. The apparatus of claim 15, wherein the means for receiving the request includes means for receiving the request for the resource if a depth of a data transmission queue for the device has been achieved.

18. The apparatus of claim 17, wherein the means for receiving the request includes means for receiving the request for the resource if a moving average of the depth of the data transmission queue for the device has been achieved.

19. The apparatus of claim 15, wherein the means for receiving the request includes means for receiving the request for the resource if a change rate in a depth of a data transmission queue for the device has been achieved.

20. The apparatus of claim 19, wherein the means for receiving the request includes means for receiving the request for the resource if a moving average of the change rate in the depth of the data transmission queue for the device has been achieved.

21. The apparatus of claim 15, wherein the means for receiving the request includes means for receiving the request for the resource if a utilization time of the resource by the device has been achieved.

22. The apparatus of claim 21, wherein the means for receiving the request includes means for receiving the request for the resource if a moving average of the utilization time of the resource by the device has been achieved.

23. The apparatus of claim 16, further comprising:
means for adjusting the threshold for requesting the resource based on a number of channel resources allocated to the device.

24. The apparatus of claim 12, further comprising:
means for determining whether any Radio Frequency (RF) channels are unallocated and available for the device;
means for allocating the resource to the device without performing the examination of the first, second, and third factors if the determination identifies an unallocated RF channel; and
means for re-allocating the resource from a different device to the device according to examination of the first, second, and third factors if the determination identifies no unallocated RF channels.

25. An apparatus coupled to a circuit switched network, the apparatus comprising:
means for receiving a request from a requesting device to transmit over the circuit switched network;
means for allocating a communication channel to the requesting device responsive to the request if the communication channel is presently unallocated; and
means for re-allocating the communication channel from another device to the requesting device according to an examination of a plurality of factors associated with the data if the communications channel is not presently unallocated;
wherein a first one of the factors includes a rate at which data is received and queued at the requesting device for transmission over the circuit switched network, a second one of the factors includes a change in the rate at which the data is received and queued at the requesting device for transmission over the circuit switched network, and a third one of the factors includes a time that at least the requesting device has previously been allocated the communications channel.

26. The apparatus of claim 25, wherein the communication channel comprises a radio frequency communication channel in the circuit switched network.

27. The apparatus of claim 25, wherein if the communication channel is not available, the means for re-allocating the communication channel from another device operates responsive to the request meeting or exceeding a threshold.

28. The apparatus of claim 27, wherein the threshold includes a data transmission depth queue.

29. The apparatus of claim 28, wherein the data transmission depth queue includes a moving average of the data transmission depth queue.

30. The apparatus of claim 27, wherein the threshold includes a change rate in a data transmission depth queue.

31. A method, comprising:
examining a first factor corresponding to an amount of data queued for transmission over a circuit switched network;
examining a second factor corresponding to a rate of change in the amount of data queued for transmission over the circuit switched network;
examining a third factor corresponding to a resource utilization time; and
allocating a channel of the circuit switched network to a device according to the examinations of the first, second, and third factors.

32. The method of claim 31, further comprising:
attempting to identify an unallocated channel on the circuit switched network;
if an unallocated channel is identified, allocating the identified channel to the device independently of the examinations of the first, second, and third factors; and
if an unallocated channel is not identified, tearing down a connection to a different device so that the channel can be allocated to the device.

* * * * *

UNITED STATES PATENT AND TRADEMARK OFFICE
CERTIFICATE OF CORRECTION

PATENT NO. : 7,554,913 B2  Page 1 of 1
APPLICATION NO. : 11/089958
DATED : June 30, 2009
INVENTOR(S) : Gupta et al.

It is certified that error appears in the above-identified patent and that said Letters Patent is hereby corrected as shown below:

Title page, item (76), please replace "1128 Oregon Ave., Palo Alto, CA (US) 94306" with --250 Curtner Ave., #4, Palo Alto, CA (US) 94306--.
At column 7, line 40, please replace "network" with --network;--.
At column 7, line 54, please replace "reallocating" with --re-allocating--.
At column 7, line 56, please replace "claim 1" with --claim 1,--.
At column 8, line 17, please replace "apparatus comprising" with --apparatus, comprising--.
At column 8, line 26, please replace "time the" with --time of the--.
At column 8, line 27, please replace "and means for" with --means for--.

Signed and Sealed this

Seventeenth Day of August, 2010

David J. Kappos
*Director of the United States Patent and Trademark Office*